No. 786,887.

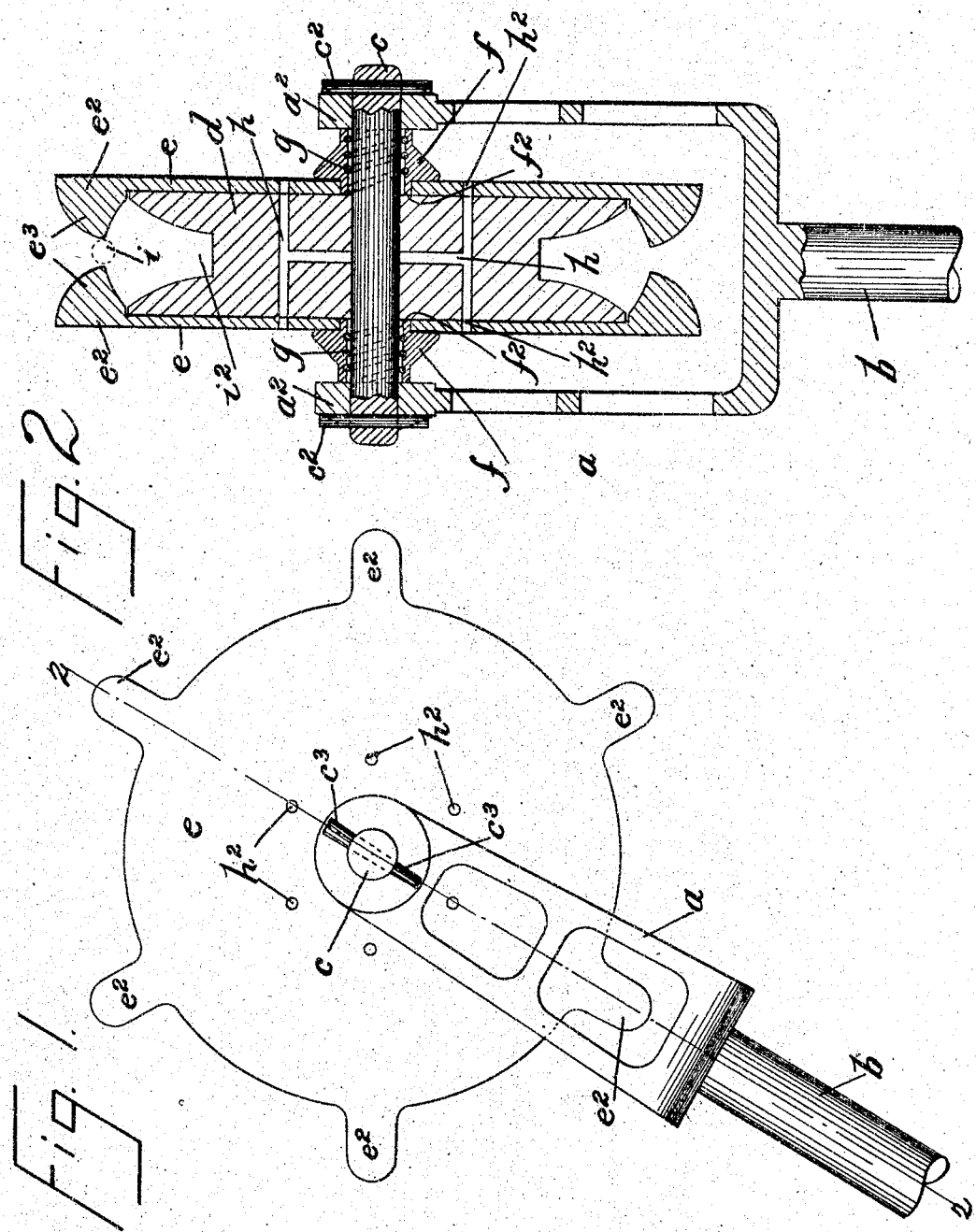

Patented April 11, 1905.

UNITED STATES PATENT OFFICE.

ANTON F. FLIERBOOM, OF ELIZABETH, NEW JERSEY, ASSIGNOR OF ONE-HALF TO JOHN F. CONRAD AND WILLIAM R. BONNELL, OF ELIZABETH, NEW JERSEY.

TROLLEY DEVICE.

SPECIFICATION forming part of Letters Patent No. 786,887, dated April 11, 1905.

Application filed January 28, 1905. Serial No. 243,013.

*To all whom it may concern:*

Be it known that I, ANTON F. FLIERBOOM, a citizen of the United States, residing at Elizabeth, in the county of Union and State of New Jersey, have invented certain new and useful Improvements in Trolley Devices, of which the following is a specification, such as will enable those skilled in the art to which it appertains to make and use the same.

This invention relates to trolley devices for trolley-cars; and the object thereof is to provide an improved device of this class which is constructed in such manner as to hold the trolley wire or conductor in connection with the trolley-wheel at all times and prevent the trolley-wheel from being accidentally detached from the wire or conductor in the operation of the trolley or of a car provided with a trolley.

The invention is fully disclosed in the following specification, of which the accompanying drawings form a part, in which the separate parts of my improvement are designated by suitable reference characters in each of the views, and in which—

Figure 1 is a side view of my improved trolley device, and Fig. 2 a section on the line 2 2 of Fig. 1.

In the practice of my invention I provide a fork $a$ of the usual or any desired form and with which the trolley-arm $b$ may be connected in the usual or any desired manner. The sides of the fork $a$ are provided at their ends with thickened heads $a^2$, and passed therethrough is the shaft or axle $c$, on which the trolley-wheel $d$ is mounted, and passing through each end of the shaft or axle $c$ is a pin $c^2$, and the outer sides of the heads $a^2$ of the fork $a$ are provided with transverse recesses $c^3$, through which said pins are also passed, and this construction prevents the shaft or axle $c$ from turning in the fork $a$.

At each side of the wheel $d$ is placed a supplemental wheel or disk $e$, and these wheels or disks are each provided at the perimeter thereof with a plurality of radially-projecting fingers or members $e^2$, which in form of the construction shown are six in number on each wheel or disk, and each of said fingers or members is provided with an inwardly-directed projection or dog $e^3$, the outer surfaces of which are curved inwardly toward the center of the wheel $d$, as shown in Fig. 2, and the inner surfaces of which are curved outwardly and inwardly.

Between each of the wheels or disks $e$ and the side arm of the fork $a$ is placed an independent and rotatable hub $f$, and in the form of construction shown these hubs are provided with journal members $f^2$, which pass through the wheels or disks $e$ and on which said wheels or disks $e$ are free to turn, and within the hubs $f$ are placed spiral springs $g$, and said hubs are preferably provided with spiral grooves in which said springs fit, and these springs $g$ are so placed that the ends thereof bear on the wheel $d$ and on the side arms of the fork $a$, and the object of these springs is to provide means for preventing the breaking of the circuit caused by the jumping, jolting, or jarring of the trolley device in the operation of the car and after the parts of the trolley device become worn. The wheel $d$ is also provided with the usual oiling ports or passages $h$ and the wheels or disks $e$ with corresponding ports or passages $h^2$, through which the wheel $d$ and the shaft or axle $c$ may be oiled or lubricated whenever desired; but my invention is not limited to any particular form of oiling or lubricating means or devices, and any suitable construction by which this result can be accomplished may be employed.

In Fig. 2 I have indicated at $i$ a trolley wire or conductor, and the space between the inwardly-directed dogs or projections $e^3$ is sufficient to allow the said wire or conductor to be passed into the groove $i^2$ of the wheel $d$ in the usual manner, and in the operation of this device the wheels or disks $e$ are free to turn with or independently of the trolley-wheel $d$, and the dogs or inwardly-directed projections $e^3$ serve to hold the wire or conductor $i$ in proper position with reference to the wheel $d$ at all times, and the shape of the said inwardly-directed dogs or projections is such that the wire or conductor $i$ will not under any ordinary circumstances jump out of the groove $i^2$ in the operation of the trolley device and said trolley device will not become accidentally disconnected from said wire or conductor. It will be observed that the radially-arranged fingers $e^2$ of the wheels or disks $e$ and the inwardly-directed projections or disks $e^3$ are so arranged that two of them on each side are always in operative position or extend over the wire or conductor $i$ when the latter is in the groove of the trolley-wheel, and it is also a well-known fact that the disconnection of the trolley wire or conductor and the trolley device is usually occasioned by a vertical and lateral movement of the trolley device, especially at curves or crossings, and the inwardly-directed projections or dogs $e^3$, arranged as above described, will serve to prevent at all times any lateral disconnection of the wire and the trolley device or any disconnection which might be occasioned by jumping, jolting, or jarring and by lateral movement of the trolley device, and in order to disconnect the wire or conductor $i$ the parts must be in proper position and the movement of the trolley device must be exactly so that the wire or conductor will pass between the projections or dogs $e^3$, and this is also true in connecting the wire or conductor with the trolley device when said parts have been disconnected.

It will be understood that in passing a crossing the transverse wires or conductors or any transverse support of any kind for the wire or conductor $i$ the radially-directed fingers or projections $e^2$ and the inwardly-directed projections or dogs $e^3$, connected therewith, strike the cross-wire or the transverse support of the wire or conductor $i$ and the wheels or disks $e$ are free to turn, and the trolley device is thus enabled to pass freely under any such obstruction without danger of breaking or any serious interference.

My improved trolley device is simple in construction and operation and perfectly adapted to accomplish the result for which it is intended, and various changes in and modifications of the construction herein shown and described may be made without departing from the spirit of my invention or sacrificing its advantages.

Having fully described my invention, what I claim as new, and desire to secure by Letters Patent, is—

1. A trolley device, comprising a block, a shaft or axle mounted therein, a trolley-wheel mounted on said shaft or axle, and independent and rotatable wheels or disks mounted on the opposite sides of the trolley-wheel, said wheels or disks being provided at their perimeters with radially-projecting fingers having inwardly-directed dogs the inner surfaces of which are inclined downwardly and inwardly and the outer surfaces of which are also inclined downwardly and inwardly, substantially as shown and described.

2. A trolley device, comprising a block, a shaft or axle mounted therein, a trolley-wheel mounted on said shaft or axle, and independent and rotatable wheels or disks mounted on the opposite sides of the trolley-wheel, said wheels or disks being provided at their perimeters with radially-projecting fingers having inwardly-directed dogs the inner surfaces of which are inclined downwardly and inwardly and the outer surfaces of which are also inclined downwardly and inwardly, and said shaft or axle being also provided at the opposite sides of the trolley-wheel and on the outer sides of the independent wheels or disks with independent hubs in which are placed spiral springs, substantially as shown and described.

In testimony that I claim the foregoing as my invention I have signed my name, in presence of the subscribing witnesses, this 27th day of January, 1905.

ANTON F. FLIERBOOM.

Witnesses:
F. A. STEWART,
C. E. MULREANY.